United States Patent [19]

Gamez

[11] Patent Number: 4,655,271
[45] Date of Patent: Apr. 7, 1987

[54] PORTABLE TIRE BEAD BREAKER

[76] Inventor: Gamaliel Gamez, 832 E. Camile St., Santa Ana, Calif. 92701

[21] Appl. No.: 850,102

[22] Filed: Apr. 10, 1986

[51] Int. Cl.⁴ .......................................... B60C 25/06
[52] U.S. Cl. .................................................. 157/1.26
[58] Field of Search .................... 157/1.26, 1.28, 1.17, 157/1.3, 1.21

[56] References Cited

U.S. PATENT DOCUMENTS

| | | | |
|---|---|---|---|
| 1,475,518 | 11/1923 | Snider | 157/1.26 |
| 2,122,388 | 6/1938 | Wilkerson | 157/1.3 X |
| 2,667,212 | 1/1954 | Zaffina | 157/1.26 |
| 2,672,185 | 3/1954 | Bergeron | 157/1.26 |
| 3,237,676 | 3/1966 | Wise | 157/1.26 |
| 3,741,271 | 6/1973 | Ross et al. | 157/1.1 |

Primary Examiner—Frank T. Yost
Attorney, Agent, or Firm—James D. Thackrey

[57] ABSTRACT

Portable apparatus for breaking the bead of a rubber tire, in which the wheel is placed over a center post. An A frame lying on its side and pivoted at its apex has a shorter lower leg which contacts the root of the tire sidewall and a longer upper leg which is forced downward by a power screw or the like pivoting the A frame and forcing a section of tire bead over the internal ridge on the rim. An adjustment screw meanwhile forces the tip of the lower leg toward the rim which is restrained by the center post.

5 Claims, 4 Drawing Figures

PORTABLE TIRE BEAD BREAKER

BACKGROUND OF THE INVENTION

1. Field of the Invention

In repairing or replacing modern rubber tires of automobiles, wheelbarrows, boat trailers and the like, the rubber bead at the inner diameter of the tire must be forced axially over a ridge on the metal rim in order to place both tire beads in the dropped center of the rim. After this is done prying tools can be inserted which will spring the beads locally over the flanges of the rim. The initial act—forcing the tire bead toward the axial center of the rim—is called "breaking the bead". This invention provides a means both inexpensive and portable for the first step in dismounting the tire—breaking the bead.

2. Description of Prior Art

Because the bead portion of a rubber tire is stiff, strong and inflexible particularly in the radial direction, the former practice of using heavy hammers, even in conjunction with prying tools, does not suffice to break the bead on modern rims. The force applied needs to be large enough, sustained enough, and local enough to get a portion of the tire bead over the customary ridge on the rim. Thus there is no way, any longer, that hand tools and brute strength can break a bead.

Tire-repair machines such as are used in tire repair shops and tire replacement shops are ordinarily hydraulically or pneumatically powered. Thus they require air compressors or hydraulic pumps and the motors to power them. Also, ordinarily the machine is heavy and permanently mounted, since capabilities other than breaking the bead are usually incorporated in the design. However, hand tools can be used for all the auxiliary functions of these machines, hence—except for convenience and speed—the commercial tire-repair machine is the only prior art for breaking tire beads, and it typically requires an air compressor and drive motor as well.

Summary of the Invention

The invention is best described by simultaneously describing its use.

A wheel with tire is held horizontally and placed on a center post which is permanently attached to a base. The center post protrudes well above the tire, and the base extends locally well beyond the outer diameter of the tire. A vertical link is pivotally mounted near the outer end of the base at its lower end, and pivotally mounted to the apex of a horizontal A frame at its upper end, such that the A is in a vertical plane and so has an upper and lower leg. The lower leg is shorter and has a beveled end which will rest on the tire sidewall snugly against the flange on the metal rim. The vertical link with its pivoted ends allows the A frame to be swung out of the way when the wheel is placed on the center post, and also tilts as required to position the beveled end of the shorter leg. The upper leg is longer and extends above the center post. A separable power screw then is attached pivotally to the top of the center post, passing through the upper leg and engages a drive nut such as a wing nut. An adjustment screw also attaches pivotally to the center post and runs substantially horizontal through the apex of the A frame and engages another wing nut. Turning the power screw wing nut applies downward pressure to the tire sidewall and/or the bead. Turning the adjustment nut assures that the beveled portion of the lower leg contacts the tire as near its inner diameter as is possible. During this operation the inner diameter of the wheel rim presses against the center post at the part of the wheel circumference at which the bead is being locally broken.

DETAILED DESCRIPTION OF THE INVENTION

Figure 1:
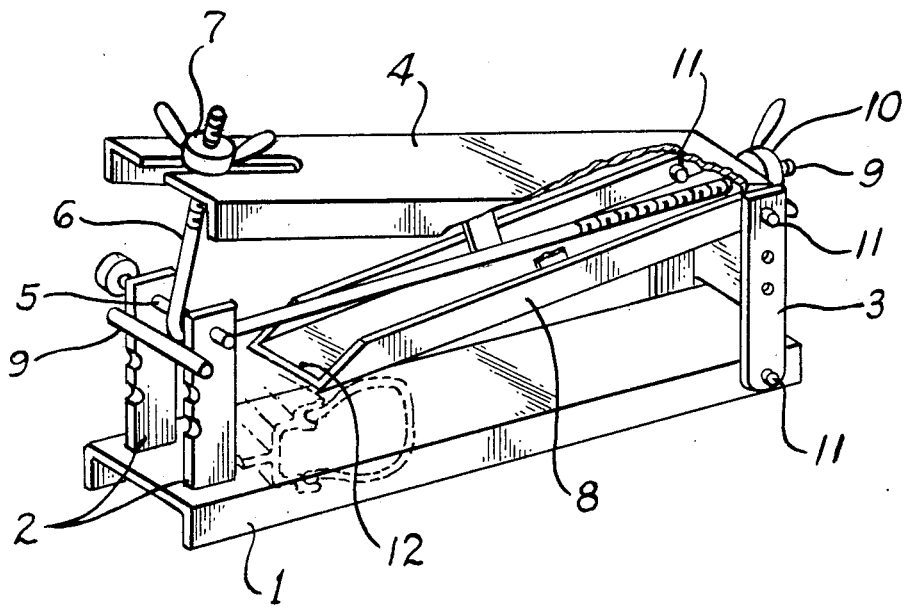
FIG. 1 is a perspective view of the invention with a portion of the tire and wheel shown as phantom lines for clarity.
Figure 2:
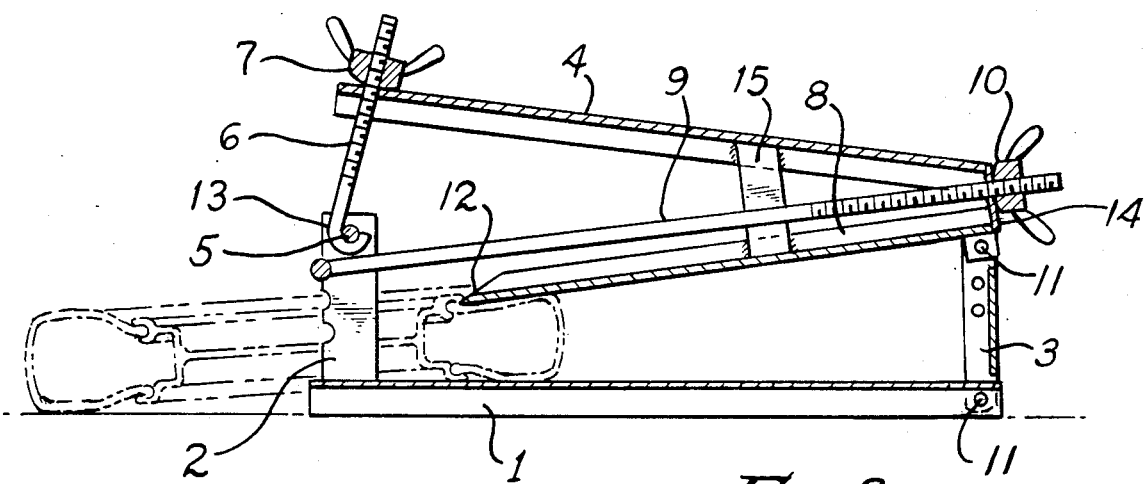
FIG. 2 is a vertical cross section of the preferred embodiment through the plane of symmetry except the screws are shown full view. A phantom tire and wheel are shown for clarity.

The preferred embodiment is illustrated in a slightly different manner in FIGS. 1 and 2. As the items are discussed, the more obvious alternatives will be pointed out.

The base, Item 1, is fixedly attached to the center post Item 2 at one end and pivotally attached to a link Item 3 at the other. Center post 2 may be a pipe or other cross section and may be adjustable in position, but the preferred embodiment is two parallel plates as shown. Link 3 as illustrated is made from a channel and is attached at both ends through pivot pins Item 11. Note that alternate pivot points are provided for the upper pivoting means, they would extend the range of wheel widths which could be serviced by the invention, although a substantial range of wheel widths can be accommodated without changing the effective length of link 3.

Figure 3:
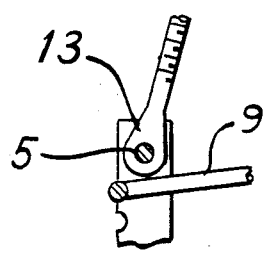
FIG. 3 shows an alternate version of the pivoting means by which the power screw is attached to the center post.

Attached to the upper or first pivoting means formed by pivot pin 11 and link 3 is a horizontally-disposed A frame consisting of Item 4, the upper leg, Item 8 the lower leg, a cross brace or braces Item 15, and Item 14 the apex portion. Both legs are shown as channels in the preferred embodiment although other cross-sections could be substituted. Upper leg 4 contains a slot at the end near center post 2 through which power screw Item 6 passes during use. Power screw 6 has a hook Item 13 on the end in FIGS. 1 and 2 and an eye 13 in alternate embodiment FIG. 3. When Item 5 removable pin is passed through either the hook or the eye 13 the assemblage forms a second pivoting means connecting power screw 6 to center post 2.

Drive nut means Item 7, when turned on power screw 6, forces the A frame comprised of Items 4, 8, and 14 to rotate about the first pivoting means. When the A frame rotates in the manner just described, the end of the lower leg 8 moves downward and presses on the tire bead with the shaped end Item 12. Item 12 is shown in FIGS. 1 and 2 as a simple bevel, but obviously other shapes and wider or narrower widths as compared to lower leg 8 might be used.

Figure 4:
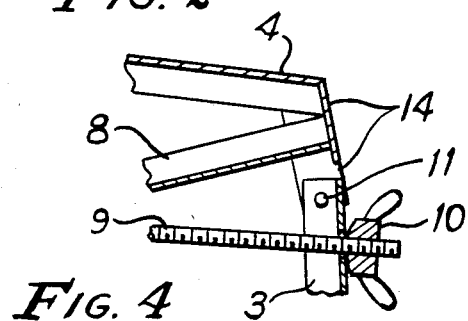
FIG. 4 shows a vertical cross section of the parts near the apex of the A frame in an alternate embodiment.

Adjustment screw 9 extends from center post 2 through the apex member Item 14 of the A frame as shown in FIGS. 1 and 2. In the preferred embodiment the adjustment screw is furnished with a third pivoting means by constructing the center post end as a T, with the crossbar of the T resting in one's choice of notches in center post 2. In the preferred embodiment, the other end of adjustment screw 9 passes through an opening in the apex member of the A frame and engages drive nut means Item 10. An alternate design in which the opening for the adjustment screw is in link 3 is shown in FIG. 4. A wing nut is shown as Item 10 in FIGS. 1, 2, and 4. The adjustment screw serves to keep the shaped end 12 of lower leg 8 snugly against the metal rim so as to cause the invention to break the bead locally rather than merely flexing the tire sidewall.

The invention may be used stepwise to break the bead all around the tire, but ordinarily hand tools are more convenient once the tire head has been forced over the ridge on the wheel at one point.

It should be noted that the drive nuts Items 7 and 10 are crowned slightly on their bearing surfaces, so as to exert pulling force without introducing bending force in their respective screws. This is the preferred embodiment. The surfaces on which they bear could be crowned, or both parts left flat and the bending tolerated. It should also be noted that the threads on the power screw and the adjustment screw may be vee threads or another thread form having a more-nearly perpendicular bearing flank, such as square threads. Substitution of a canted-washer advancing mechanism for the screws may be made, but is not claimed. Such a canted washer advance mechanism is used as a jack in Volkswagen cars.

The invention having been described in its preferred embodiment, it is clear that it is susceptible to numerous modifications and embodiments within the ability of those skilled in the art without the exercise of the inventive faculty. Accordingly the scope of this invention is defined by the scope of the following claims.

I claim:

1. Apparatus to break the bead from the rim during removal of rubber tires from mounting wheels, comprising:

a base extending from the center of the wheel radially outward substantially beyond the tire, and a link pivotally attached to the outer portion of said base, having first pivoting means at its free end, and an A frame the apex of which is attached to the first pivoting means at the free end of said link, the lower leg of said frame adjacent said base being shorter and having an end shaped to press on the tire bead, and the longer upper leg having an opening near its end, and a center post fixed to said base extending toward said A frame, having at its free end second and third pivoting means, and a power screw one end of which engages the second pivoting means, said power screw being capable of passing through the opening in the upper leg of said A frame, and drive nut means positioned on said power screw beyond the opening, and an adjustment screw one end of which engages the third pivoting means, the other end passing through an opening in the apex portion of said A frame, and a second drive nut means on said adjustment screw beyond the apex portion, whereby a tire on a wheel may be placed on said center post, said adjustment screw may be operated so as to place the lower leg of said A frame on the tire bead, and said power screw operated so as to tilt said A frame toward said base breaking the bead from the rim.

2. Apparatus to break the bead from the rim during removal of rubber tires from mounting wheels, comprising:

a base extending from the center of the wheel radially outward substantially beyond the tire, and a link pivotally attached to the outer portion of said base, having first pivoting means at its free end, and an A frame the apex of which is attached to the first pivoting means at the free end of said link, the lower leg of said frame adjacent said base being shorter and having an end shaped to press on the tire bead, and the longer upper leg having an opening near its end, and a center post fixed to said base extending toward said A frame, having at its free end second and third pivoting means, and a power screw one end of which engages the second pivoting means, said power screw being capable of passing through the opening in the upper leg of said A frame, and drive nut means positioned on said power screw beyond the opening, and an adjustment screw one end of which engages the third pivoting means, the other end passing through an opening in said link, and whereby a tire on a wheel may be placed on said center post, said adjustment screw may be operated so as to place the lower leg of said A frame on the tire bead, and said power screw operated so as to tilt said A frame toward said base breaking the bead from the rim.

3. Apparatus as in claim 1, in which said center post consists of two spaced elongated plates.

4. Apparatus as in claim 1, in which said center post consists of two spaced elongated plates and said power screw has a hooked end which engages a pin spanning the space between the elongated plates to provide the second pivoting means.

5. Apparatus as in claim 4, in which said adjustment screw terminates in a circular cross-section crossbar which engages semicircular notches in the plates comprising said center post to provide the third pivoting means.

* * * * *